(12) United States Patent
Kataeva et al.

(10) Patent No.: US 11,928,576 B2
(45) Date of Patent: Mar. 12, 2024

(54) ARTIFICIAL NEURAL NETWORK CIRCUIT AND METHOD FOR SWITCHING TRAINED WEIGHT IN ARTIFICIAL NEURAL NETWORK CIRCUIT

(71) Applicant: DENSO CORPORATION, Kariya (JP)

(72) Inventors: Irina Kataeva, Kariya (JP); Shigeki Otsuka, Kariya (JP)

(73) Assignee: DENSO CORPORATION, Kariya (JP)

(*) Notice: Subject to any disclaimer, the term of this patent is extended or adjusted under 35 U.S.C. 154(b) by 730 days.

(21) Appl. No.: 16/654,394

(22) Filed: Oct. 16, 2019

(65) Prior Publication Data

US 2020/0125936 A1 Apr. 23, 2020

(30) Foreign Application Priority Data

Oct. 18, 2018 (JP) .................................. 2018-196711
Sep. 18, 2019 (JP) .................................. 2019-169724

(51) Int. Cl.
*G06N 3/063* (2023.01)
*G06F 11/30* (2006.01)
*G06N 3/08* (2023.01)

(52) U.S. Cl.
CPC ......... *G06N 3/063* (2013.01); *G06F 11/3058* (2013.01); *G06N 3/08* (2013.01)

(58) Field of Classification Search
CPC ....... G06N 3/063; G06N 3/08; G06F 11/3058
See application file for complete search history.

(56) References Cited

U.S. PATENT DOCUMENTS

| 5,216,746 A | 6/1993 | Yoshizawa et al. |
| 2012/0259804 A1* | 10/2012 | Brezzo .................. G06N 3/063 706/33 |
| 2017/0017877 A1* | 1/2017 | Kataeva ................ G06N 3/08 |

(Continued)

FOREIGN PATENT DOCUMENTS

| JP | 2618470 B | 6/1997 |
| WO | WO 2017/010048 | 1/2017 |
| WO | WO 2017/010049 | 1/2017 |

OTHER PUBLICATIONS

DAC'18, Jun. 24-29, 2018, Association for Computing Machinery, Thermal Aware Optimizations of ReRAM-based Neuromorphic Computing Systems (Year: 2018).*

(Continued)

*Primary Examiner* — Li B. Zhen
*Assistant Examiner* — Moriam Mosunmola Godo
(74) *Attorney, Agent, or Firm* — MASCHOFF BRENNAN

(57) ABSTRACT

The present disclosure describes an artificial neural network circuit including: at least one crossbar circuit to transmit a signal between layered neurons of an artificial neural network, the crossbar circuit including multiple input bars, multiple output bars arranged intersecting the input bars, and multiple memristors that are disposed at respective intersections of the input bars and the output bars to give a weight to the signal to be transmitted; a processing circuit to calculate a sum of signals flowing into each of the output bars while a weight to a corresponding signal is given by each of the memristors; a temperature sensor to detect environmental temperature; and an update portion that updates a trained value used in the crossbar circuit and/or the processing circuit.

16 Claims, 11 Drawing Sheets

(56) References Cited

U.S. PATENT DOCUMENTS

2017/0017879 A1    1/2017   Kataeva et al.
2018/0349508 A1*  12/2018   Bequet .................. G06F 18/217
2020/0164763 A1*   5/2020   Holme .................... B60L 58/10

OTHER PUBLICATIONS

U.S. Appl. No. 16/589,415, filed Oct. 1, 2019, Oct. 1, 2019, Irina Kataeva, et al.

K. K. Likharev, "CrossNets: Neuromorphic hybrid CMOS/nanoelectronic networks", Sci. Adv. Mater., vol. 3, pp. 322-331, Jun. 2011.

H. Nili, et al., "Compact Modeling of I-V Characteristics, Temperature Dependency, Variations, and Noise of Integrated, Reproducible Metal-Oxide Memristors", Oct. 17, 2018.

Xiaoxiao Liu, et al., "A heterogeneous computing system with memristor-based neuromorphic accelerators", High Performance Extreme Computing Conference, 2014 IEEE.

\* cited by examiner

ARTIFICIAL NEURAL NETWORK CIRCUIT AND METHOD FOR SWITCHING TRAINED WEIGHT IN ARTIFICIAL NEURAL NETWORK CIRCUIT

CROSS REFERENCE TO RELATED APPLICATION

The present application claims the benefit of priority from Japanese Patent Application No. 2018-196711 filed on Oct. 18, 2018, and Japanese Patent Application No. 2019-169724 filed on Sep. 18, 2019. The entire disclosures of all of the above applications are incorporated herein by reference.

TECHNICAL FIELD

The present disclosure relates to an artificial neural network circuit including a crossbar circuit provided with a memristor, and a method for switching trained weights in the artificial neural network circuit.

BACKGROUND

It has been confirmed that an artificial neural network (hereinafter, referred to as an NN) such as a deep neural network exhibits recognition performance that surpasses recognition performance by conventional machine learning in the field of image recognition, for example.

SUMMARY

The present disclosure describes an artificial neural network circuit including: at least one crossbar circuit to transmit a signal between layered neurons of an artificial neural network, the crossbar circuit including multiple input bars, multiple output bars arranged intersecting the input bars, and multiple memristors that are disposed at respective intersections of the input bars and the output bars to give a weight to the signal to be transmitted, as a variable resistance memory; a processing circuit to calculate a sum of signals flowing into each of the output bars while a weight to a corresponding signal is given by each of the memristors; a temperature sensor to detect environmental temperature; and an update portion that updates a trained weight used in the crossbar circuit and/or the processing circuit.

BRIEF DESCRIPTION OF DRAWINGS

Objects, features and advantages of the present disclosure will become more apparent from the following detailed description with reference to the accompanying drawings. In the drawings.

DETAILED DESCRIPTION

Figure 1:
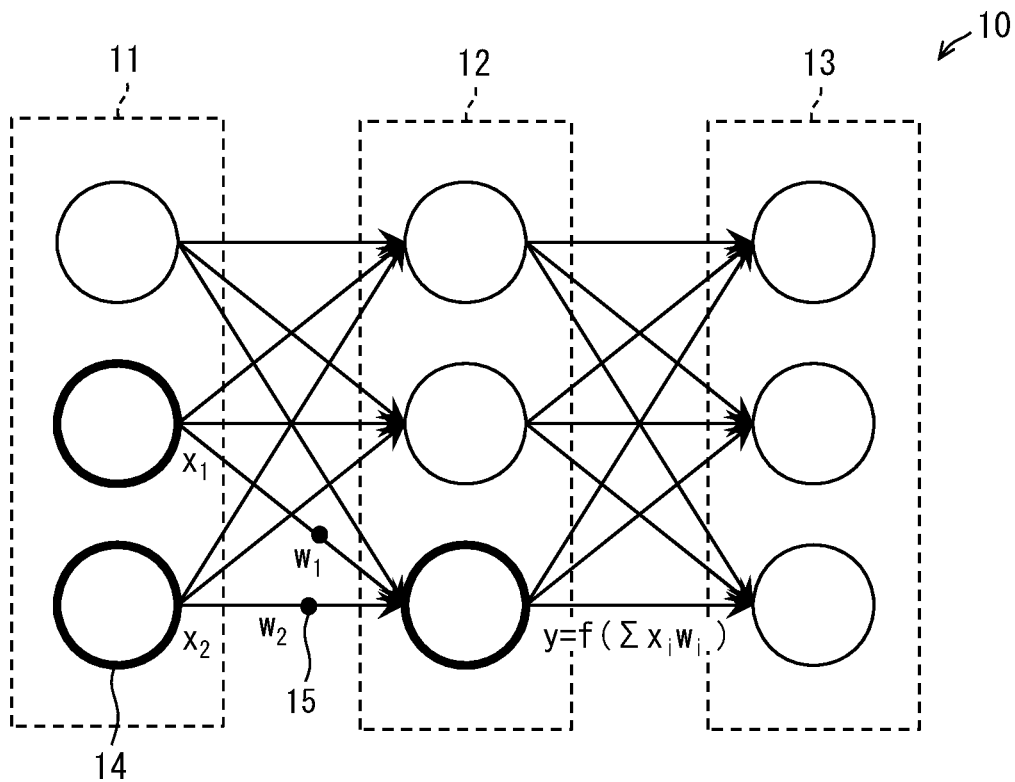
FIG. 1 is a diagram illustrating an example of a multilayer NN.

An artificial neural network (hereinafter, referred to as an artificial NN) such as a deep neural network may exhibit recognition performance that surpasses recognition performance by conventional machine learning in the field of image recognition, for example. The artificial NN typically has a high computational load. An artificial NN may be software-implemented by a so-called general-purpose computing on GPU (GPGPU) using a graphic processing unit (GPU) suitable for highly efficient parallel computation.

The inventors of the present application have found the following. A GPGPU may consume a large amount of power. An artificial NN using GPGPU may be applicable to an application based on cloud computing, for example. It may be difficult to apply the artificial NN to an application based on non-cloud computing. For example, examples of an application based on non-cloud computing may include an application used in a vehicle, being configured to recognize an obstacle to execute anti-collision control for preventing or alleviating a collision with the obstacle, an application for automatically driving a vehicle to a destination. Execution of these applications may require operation at high speed even with low power consumption. A hardware circuit having low power consumption, high speed, and a small size, dedicated to an artificial NN, may be desired.

As one of hardware circuits dedicated to artificial NNs, the inventors of the present disclosure have researched an artificial NN circuit including a crossbar circuit having a variable resistance memory (hereinafter referred to as a "memristor"). The research results are disclosed in WO 2017/010048 A (corresponding to US 2017/0017877 A1) and WO 2017/010049 A (corresponding to US 2017/0017879 A1), which are herein incorporated by reference.

The crossbar circuit is configured such that multiple input bars and multiple output bars are disposed intersecting each other, and that each of the multiple input bars and each of the multiple output bars are connected at respective intersection points via the memristor. When voltage signals in accordance with output values of a previous stage neuron are input to each of the multiple input bars of the crossbar circuit, each of the voltage signals is multiplied by a conductance value of the memristor as a weight. Then, the voltage signals is output to a processing circuit connected to the output bars, and the processing circuit calculates a summed voltage signal. Then, the processing circuit generates and outputs an output value corresponding to an activation function from the summed voltage signal calculated as an input to a subsequent stage neuron. As described above, a synapse is hardware-implemented in the artificial NN using the crossbar circuit.

In an artificial NN circuit provided with a crossbar circuit, a weight given to each signal to be transmitted is learned by computer simulation, and each memristor is set to a conductance value corresponding to the trained weight, for example. The memristor can rewrite a resistance value between a minimum value and a maximum value by applying a voltage.

In the artificial NN circuit provided with the crossbar circuit having the memristor, performance may deteriorate due to temperature characteristics of the memristor when environmental temperature at which the artificial NN circuit is placed changes. For example, when image recognition is performed using the above-described artificial NN circuit, a recognition error rate may increase as the environmental temperature rises. Incidentally, the environmental temperature may correspond to temperature of surrounding environment, temperature where an artificial NN circuit is placed. In addition, the environmental temperature may correspond to temperature caused by heat generated by peripheral CMOS circuits around memristors on the same chip. The environmental temperature may be referred to as ambient temperature.

The present disclosure describes an artificial NN circuit capable of suppressing deterioration in performance when environmental temperature changes, and a method for switching trained weights in the artificial NN circuit.

According to one aspect of the present disclosure, an artificial neural network circuit may include: at least one crossbar circuit that is configured to transmit a signal between layered neurons of an artificial neural network, wherein the crossbar circuit includes a plurality of input bars, a plurality of output bars arranged intersecting the input bars, and a plurality of memristors that are disposed at respective intersections of the input bars and the output bars to give a weight to the signal to be transmitted, as a variable resistance memory; a processing circuit that is configured to calculate a sum of signals flowing into each of the output bars as signal processing in the layered neurons while a weight to a corresponding signal is given by each of the memristors; a temperature sensor that is configured to detect environmental temperature of the crossbar circuit; and an update portion that is configured to update a trained weight used in the crossbar circuit and/or the processing circuit to a different trained weight according to a change in the environmental temperature.

According another aspect of the present disclosure, a method for switching a trained weight in an artificial neural network circuit may be provided. The artificial neural network circuit may include: at least one crossbar circuit configured to transmit a signal between layered neurons, the crossbar circuit including a plurality of input bars, a plurality of output bars arranged intersecting the input bars, and a plurality of memristors disposed at respective intersections of the input bars and the output bars to give a weight to the signal to be transmitted, as a variable resistance memory; and a processing circuit configured to calculate a sum of signals flowing into each of the output bars as signal processing in the layered neurons while a weight to a corresponding signal is given by each of the memristors. The method may include: detecting environmental temperature of the crossbar circuit by a temperature sensor; and updating a trained weight used in the crossbar circuit and/or the processing circuit to a different trained weight corresponding to a change in the environmental temperature in accordance with the change in the environmental temperature of the crossbar circuit by an update portion.

Each of the memristors provided in the crossbar circuit has temperature characteristics. Thus, the conductance value set in each of the memristors changes in accordance with change in environmental temperature. When change rates of the conductance value are substantially identical in each of the memristors included in the crossbar circuit, mutual relations of weights corresponding to the respective conductance values are maintained among the memristors. The conductance value of each of the memristors may not necessarily change at a same rate in accordance with change in environmental temperature. That is, the same temperature change may cause some of the memristors to be greatly changed in the conductance value, and some of the memristors to be less changed in the conductance value. As described above, when a rate of change of the conductance value due to change in environmental temperature varies in each of the memristors included in the crossbar circuit, the mutual relations of weights among the memristors collapses in accordance with the change in environmental temperature. As a result, the artificial NN circuit deteriorates in performance.

In the artificial NN circuit and the trained weight switching method in the artificial NN circuit according to the present disclosure, the environmental temperature of the crossbar circuit is detected by the temperature sensor. In accordance with the detected change in the environmental temperature, the trained weight used in the crossbar circuit and/or the processing circuit is updated in accordance with the change in the environmental temperature.

Using this configuration enables suppressing influence of variation in change in a conductance value of each of the memristors even when the environmental temperature changes, so that it may be possible to suppress deterioration in performance of the artificial NN circuit.

First Embodiment

An embodiment of an artificial NN circuit according to the present disclosure will be described reference to the drawings. The artificial NN circuit according to the present embodiment can be used to hardware-implement a multilayer NN (multilayer perceptron) in which at least neurons are layered in three layers, i.e., a so-called convolutional NN. In the following description, an example will be described in which a multilayer NN is hardware-implemented using an artificial NN circuit.

FIG. 1 is a diagram conceptually illustrating an example of a multilayer NN 10. As illustrated in FIG. 1, the multilayer NN 10 includes an input layer 11, an intermediate layer 12, and an output layer 13. Each of the input layer 11, the intermediate layer 12, and the output layer 13 has at least one neuron 14. The intermediate layer 12 is also called a hidden layer.

When input data for the multilayer NN 10 is input to the input layer 11, outputs $x_1, x_2, \ldots$, corresponding to the input data, are output from each neuron 14 of the input layer 11. Then, the outputs $x_1, x_2, \ldots$, are multiplied, respectively by weights $w_1, w_2, \ldots$, as synapses 15, and are input to the at least one neuron 14 of the intermediate layer 12. The at least one neuron 14 of the intermediate layer 12 calculates a sum $\Sigma w_i x_i$ of the multiplied outputs, and converts the sum $\Sigma w_i x_i$ using an activation function "f" such as ReLU or tan h to generate an output y ($=f(\Sigma w_i x_i)$). Then, the generated output y is output to each neuron 14 of a subsequent layer. The subsequent layer is the output layer 13 when the multilayer NN 10 has three layers. In the case of four or more layers, the subsequent layer is a subsequent intermediate layer (not illustrated). As described above, the input data is converted by the activation function "f" of each neuron 14 and is finally input to the output layer 13. The at least one neuron 14 of the output layer 13 converts the input using a soft max function, for example, and outputs it.

The multilayer NN 10 is applicable to an application of classifying an image into multiple categories (e.g., numerals of from 0 to 9) using an image (e.g., an MNIST data set) as input data. In this case, the input data to the input layer 11 can be multiple pixel values (e.g., from 0 to 255) included in the image. The output from each neuron 14 of the output layer 13 can be configured to be probability that the image as input data belongs to each category. The weights of synapses 15 of the multilayer NN 10 are determined by learning to be suitable for the application described above.

An image as input data can be classified into multiple categories by selecting a category corresponding to the highest probability among the probabilities output from the respective neurons 14 corresponding to each of the multiple categories in the output layer 13. The multilayer NN 10 is also applicable to other applications. For example, the multilayer NN 10 is also applicable to detection of an object or a person, recognition of a human face, recognition of a road sign, and the like. In addition, the multilayer NN 10 is also applicable to applications such as information compression, motion control, noise removal, and time series prediction.

Figure 2:
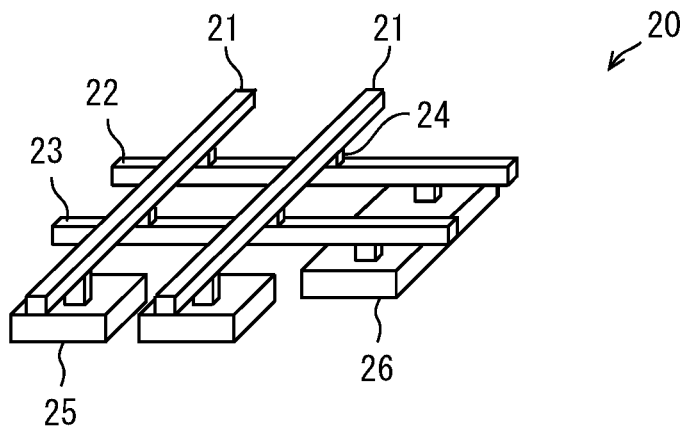
FIG. 2 is a diagram illustrating a crossbar circuit.

An artificial NN circuit configured to hardware-implement the multilayer NN 10 will be described with reference to FIG. 2 to FIG. 4. As illustrated in FIG. 2, the artificial NN circuit includes a crossbar circuit 20 that hardware-implements synapse, and CMOS circuits 25 and 26 that hardware-implements at least one neuron 14. The CMOS circuits 25 and 26 are formed on a CMOS circuit board. The crossbar circuit 20 may be formed on the CMOS circuit board on which the CMOS circuits 25 and 26 are formed.

The crossbar circuit 20 transmits a signal between adjacent layers of the multilayer NN 10 while giving a weight as a synapse. FIG. 2 to FIG. 4 each illustrates only a part of the crossbar circuit 20 for convenience of illustration and explanation. As illustrated in FIG. 2, the crossbar circuit 20 has multiple input bars 21 and multiple output bars 22 and 23. The multiple input bars 21 and the multiple output bars 22 and 23 are arranged to intersect each other. For example, a voltage signal corresponding to the pixel value described above is input to each of the input bars 21 through the CMOS circuit 25 as an input neuron. Each of intersections of the multiple input bars 21 and the multiple output bars 22 and 23 is provided with a memristor 24 serving as a variable resistance memory configured to give a weight to each of input signals to be transmitted to the output bars 22 and 23 from the input bars 21. The multiple input bars 21 and the multiple output bars 22 and 23 are connected to each other through the corresponding memristor 24.

The memristor 24 is a variable resistance memory that can be set to a different resistance state between a minimum value of resistance and a maximum value thereof using applied voltage. For example, a conductance value of the memristor 24 can be increased by applying negative write voltage and can be decreased by applying positive write voltage, using a conductance rewriting device 35. The memristor 24 maintains a resistance state (conductance value) set unless voltage having a magnitude equal to or more than positive and negative write voltage thresholds is applied. Examples of an element available for the memristor 24 described above include a $Pt/TiO_2/Pt$ metallic oxide element, a phase-change memory, a magnetic tunnel junction memory, a Flash memory, a solid state resistive memory, and the like. The memristor 24 may be a non-volatile variable resistance memory even if a control mode is different.

The crossbar circuit 20, and the CMOS circuits 25 and 26 serving as an input neuron and an output neuron, respectively, can be configured as a hybrid CMOS circuit in which the memristor 24 is incorporated. Hereinafter, the CMOS circuit 26 serving as an output neuron will be described with reference to FIG. 3. FIG. 3 is an electric circuit diagram illustrating the crossbar circuit 20, and the CMOS circuit 26 serving as an output neuron.

Figure 3:
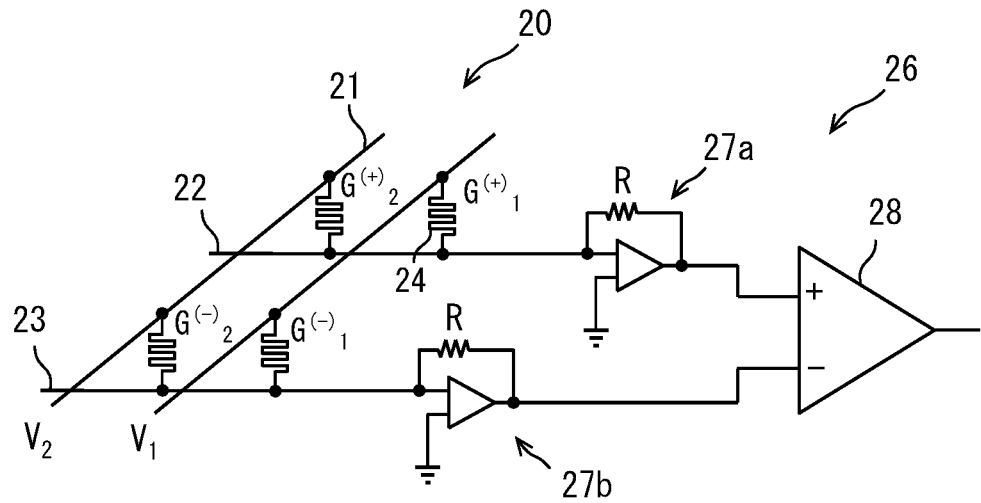
FIG. 3 is a diagram illustrating a crossbar circuit and a CMOS circuit.

As illustrated in FIG. 3, when a pair of output bars 22 and 23 is used as differential paired output bars in the present embodiment, a positive or negative weight can be given to a signal to be input into each of the input bars 21 in accordance with a difference between a weight (conductance value) $G^{(+)}$ by the memristor 24 connected to the output bar 22 on a positive side of the differential paired output bars and a weight (conductance value) $G^{(-)}$ by the memristor 24 connected to the output bar 23 on a negative side thereof, between the respective input bars 21. The output bar 22 on the positive side of the differential paired output bars is connected to a non-inverting input terminal of a differential operational amplifier 28, and the output bar 23 on the negative side thereof is connected to an inverting input terminal of the differential operational amplifier 28.

As illustrated in FIG. 3, the CMOS circuit 26 serving as an output neuron includes: an adder 27a configured to calculate and output a sum of signals output from the output bar 22 on the positive side to which the memristor 24 for giving a positive weight ($G^{(+)}$) to an input signal is connected; an adder 27b configured to calculate and output a sum of signals output from the respective output bar 23 on the negative side to which the memristor 24 for giving a negative weight ($G^{(-)}$) to an input signal is connected; and the differential operational amplifier 28 configured to calculate and output a difference between the sums output from the respective adders 27a and 27b. In addition, although not illustrated, the CMOS circuit 26 serving as an output neuron also includes an activation function processing circuit configured to convert the difference between the sums output from the differential operational amplifier 28 using a predetermined activation function f, and output the converted value. As described above, the adders 27a and 27b, the differential operational amplifier 28, and the activation function processing circuit each can be composed of CMOS elements in the CMOS circuit board. The calculation of the difference and the conversion by the activation function f, instead of being performed in the CMOS circuit 26, may be performed in a digital processing circuit or the like provided separately, after outputs of the adders 27a and 27b are each converted into a digital signal, for example.

The adders 27a and 27b each have a configuration in which a resistor having a resistance value R is connected between the input and output of the operational amplifier. When voltage signals $V_1$ and $V_2$ are input to the respective input bars 21 as illustrated in FIG. 3, the voltage signal $V_1$ is multiplied by conductance $G^{(+)}_1$, and the voltage signal $V_2$ is multiplied by conductance $G^{(+)}_2$, and then the adder 27a adds the voltage signals $V_1$ and $V_2$ to calculate a sum of them. The sum is further multiplied by R in the adder 27a. Likewise, the adder 27b also adds a result obtained by multiplying the voltage signal $V_1$ by conductance $G^{(-)}_1$, and a result obtained by multiplying the voltage signal $V_2$ by conductance $G^{(-)}_2$ to calculate a sum of them, and the sum is further multiplied by R.

The differential operational amplifier 28 calculates and outputs a difference between the sum output from the adder 27a and the sum output from the adder 27b. As a result, the CMOS circuit 26 serving as an output neuron acquires a result expressed in Expression 1 below.

$$\text{Output voltage} = R(G^{(+)}_1 V_1 - G^{(-)}_1 V_1 + G^{(+)}_2 V_2 - G^{(-)}_2 V_2) \quad \text{(Expression 1)}$$

When the voltage signal $V_1$ as an input signal is transmitted via the differential paired output bars 22 and 23, a weight given by the memristor 24 is $R(G^{(+)}_1 - G^{(-)}_1)$. In addition, a weight given by the memristor 24 when the voltage signal $V_2$ as an input signal is transmitted is $R(G^{(+)}_2 - G^{(-)}_2)$. Although not illustrated in FIG. 2 and FIG. 3, the same applies to weights for other input signals.

Thus, when a certain input signal is multiplied by a positive weight, the memristor 24 provided between the output bar 22 connected to the non-inverting input terminal of the differential operational amplifier 28, and the input bar 21, may have a conductance value set larger than a conductance value of the memristor 24 provided between the output bar 23 connected to the inverting input terminal and the input bar 21 by a positive weight to be set. Conversely, when a certain input signal is multiplied by a negative weight, the memristor 24 provided between the output bar 23 connected to the inverting input terminal, and the input bar 21, may have a conductance value set larger than a conductance value of the memristor 24 provided between the output bar 22 connected to the non-inverting input terminal and the input bar 21 by a negative weight to be set. As described above, the crossbar circuit 20 according to the present embodiment can realize positive and negative weights as synapse weights, and the crossbar circuit 20 can simulate excitatory and inhibitory synapses.

Figure 4:
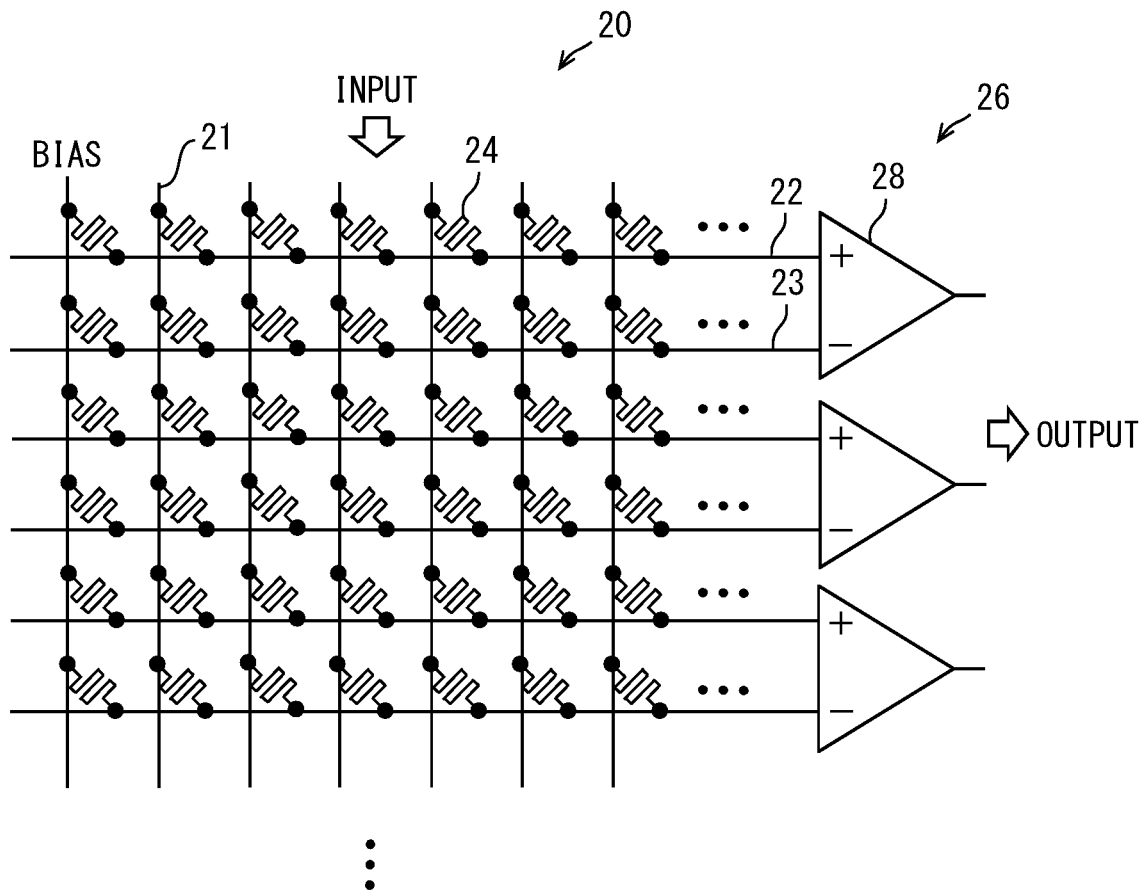
FIG. 4 is a diagram illustrating a crossbar circuit.

FIG. 4 illustrates an enlarged view of the crossbar circuit 20 and the CMOS circuit 26 serving as an output neuron in an expanded range. In FIG. 4, the adders 27a and 27b illustrated in FIG. 3 are omitted. In practice, the adders 27a and 27b are provided on an input side of each differential operational amplifier 28. In addition, the activation function processing circuit described above is also omitted in FIG. 4. In practice, the activation function processing circuit is provided on an output side of each differential operational amplifier 28. As illustrated in FIG. 4, a bias signal is input to the input bar 21 of the crossbar circuit 20 in addition to the voltage signal corresponding to the pixel value described above or the voltage signal corresponding to output from an output neuron in a pre-stage layer. The magnitude of the bias signal is normally set to a predetermined value (for example, "1").

Figure 5:
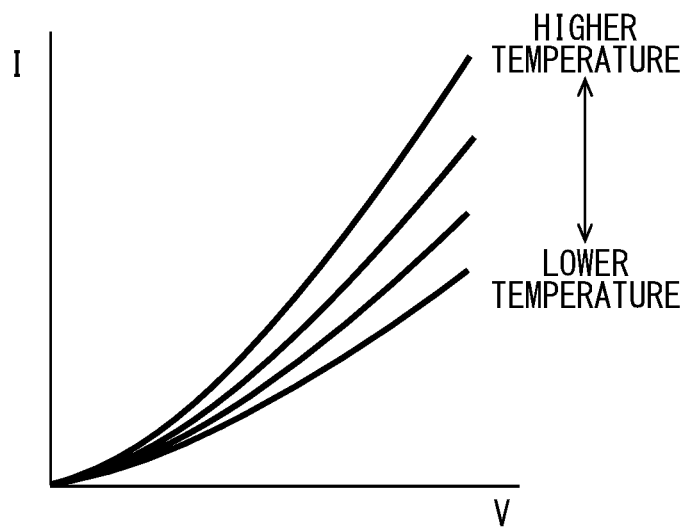
FIG. 5 is a graph showing an example of temperature characteristics of a memristor.

Each of the memristors 24 provided in the crossbar circuit 20 has temperature characteristics. Thus, the conductance value set in each of the memristors 24 changes in accordance with change in environmental temperature. FIG. 5 shows an example of temperature characteristics of the memristor 24 as described above. As shown in FIG. 5, even when the input voltage V is the same, the conductance value of the memristor 24 changes in accordance with environmental temperature to result in change in an output current I.

Figure 6:
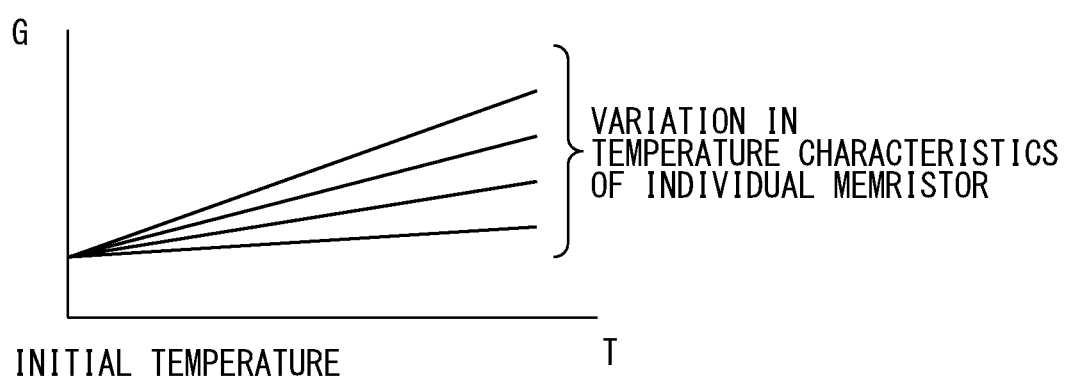
FIG. 6 is a graph illustrating variations in temperature characteristics of a memristor.

When a rate of change of a conductance value of the memristor 24 included in the crossbar circuit 20 is uniform in all the memristors 24, mutual relations of weights corresponding to respective conductance values are maintained among the memristors 24. As shown in FIG. 6, the conductance value of each of the memristors 24 may not necessarily change at a uniform rate in accordance with change in environmental temperature. That is, the same temperature change may cause some of the memristors 24 to be greatly changed in the conductance value, and some of the memristors 24 to be less changed in the conductance value. As described above, when a rate of change of the conductance value due to change in environmental temperature varies in each of the memristors 24 included in the crossbar circuit 20, the mutual relations of weights among the memristors 24 collapse. As a result, the artificial NN circuit may deteriorate in performance.

There is prepared an artificial NN circuit embodying the multilayer NN 10 having the configuration illustrated in FIG. 1 in which each of the memristors 24 of the crossbar circuit 20 was caused to learn weights for signals transmitted between neurons and weights for bias signals, using the MNIST data set. More specifically, an input image had a size of 28 by 28 pixels, so that the number of neurons in the input layer 11 was 785 (28×28+1) corresponding to a pixel value of each pixel and for bias input. The number of neurons in the intermediate layer 12 was set to 301 in total by adding the number of neurons receiving input from neurons in the input layer 11 set to 300, to the number thereof for bias input. The number of neurons in the output layer 13 was ten. Thus, the number of input bars of the crossbar circuit 20 between the input layer 11 and the intermediate layer 12 was set to 785, and the number of output bars was 600 due to using the differential paired output bars. In addition, the number of input bars of the crossbar circuit 20 between the intermediate layer 12 and the output layer 13 was 301 corresponding to the number of neurons (300) of the intermediate layer 12 and the bias signal, and the number of output bars was 20 due to using the differential paired output bars.

Figure 7:
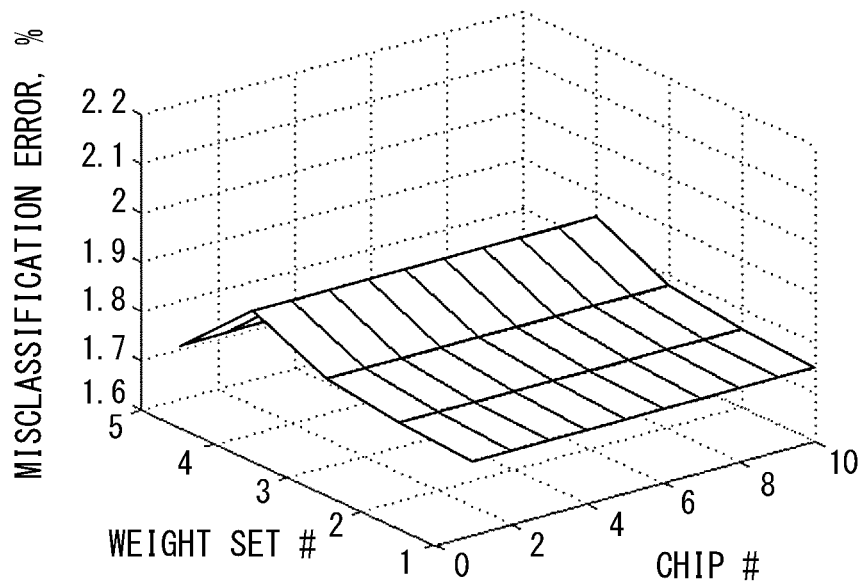
FIG. 7 is a graph showing results acquired by examining incidence rates of a recognition error of MNIST data at room temperature state using each chip mounted with an artificial NN circuit.

Then, five sets of weights for signals transmitted between neurons learned in a room temperature state and weights for bias signals were prepared, and the five sets of weights (corresponding to sets of weights #1 to #5) were set in ten chips for each of the memristors 24 of the crossbar circuit 20 of each chip mounted with the artificial NN circuit described above. Each chip mounted with the artificial NN circuit, prepared as described above, was used to examine an incidence rate of a recognition error of the MNIST data (misclassification error) in the room temperature state (27° C., for example). Results of the examination are shown in FIG. 7. As shown in FIG. 7, when environmental temperature was in the room temperature state, there is no significant difference in the incidence rate of a recognition error in each chip for which the same set of weights was set. Between different sets of weights, there is a slight difference in the incidence rate of a recognition error. Incidentally, the room temperature may be initial temperature, predetermined temperature, or the like.

Figure 8:
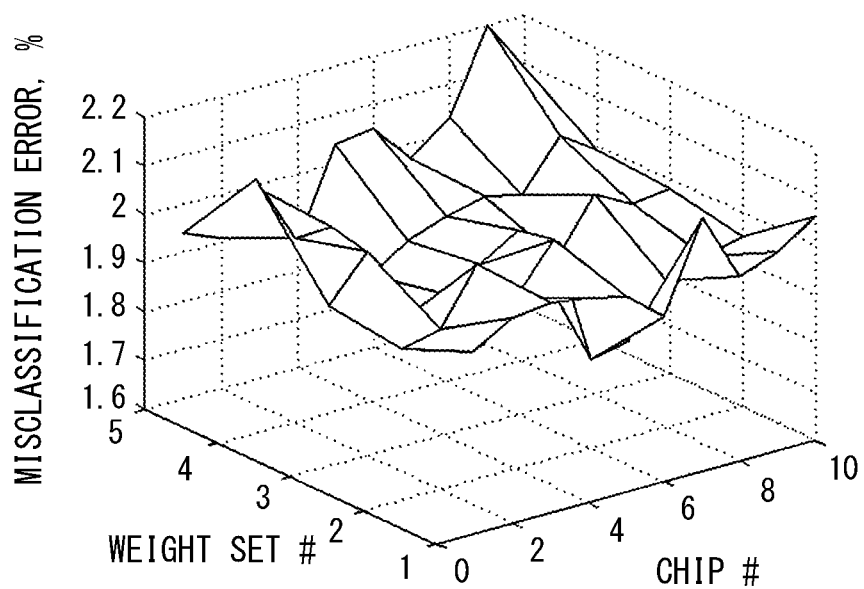
FIG. 8 is a graph showing results acquired by examining incidence rates of a recognition error when an artificial NN circuit mounted on each chip is used at an environmental temperature of 100° C.

There were examined incidence rates of a recognition error when the artificial NN circuit mounted on each chip was used at an environmental temperature of 100° C. FIG. 8 shows results of the examination. As shown in FIG. 8, it was found that the incidence rates of a recognition error of the artificial NN circuit mounted on each chip was higher than that in the room temperature state, and there was a difference in the incidence rate of a recognition error between each chip in any set of weights. This supports that variations occur in the rate of change of the conductance value due to the change of the environmental temperature in each memristor 24 included in the crossbar circuit 20 of each chip.

Figure 9:
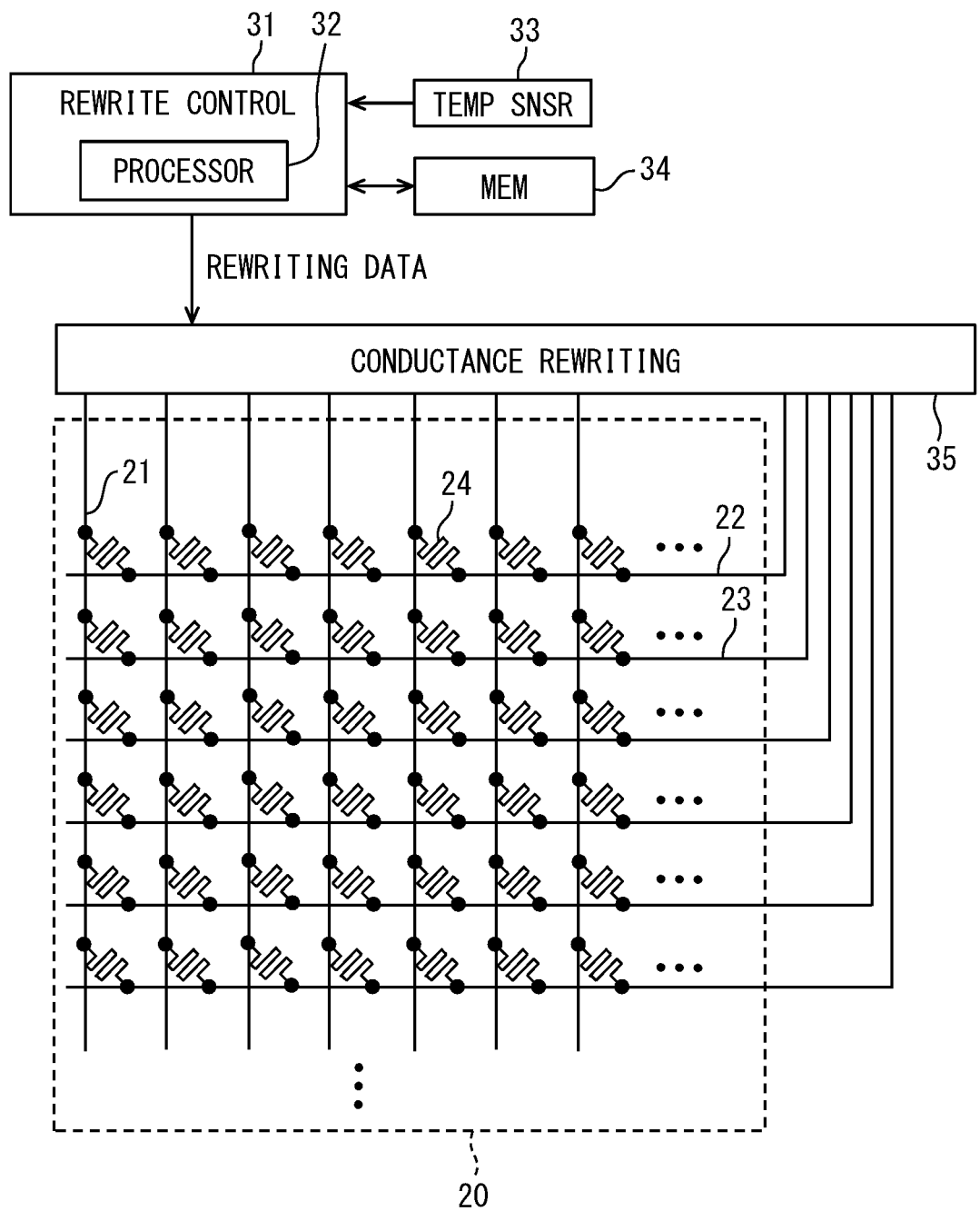
FIG. 9 is a block diagram illustrating a configuration for updating a trained weight to be used in a crossbar circuit.

The artificial NN circuit of the present embodiment is configured to update a trained weight which has been set in the crossbar circuit 20 in accordance with change in environmental temperature. To implement the configuration, as illustrated in FIG. 9, the artificial NN circuit of the present embodiment includes a rewrite control device 31, a temperature sensor 33, a memory device 34, and the conductance rewriting device 35, as a configuration for updating the trained weight. The temperature sensor 33 detects environmental temperature of the crossbar circuit 20, and outputs the detected environmental temperature to the rewrite control device 31. The memory device 34 stores a trained weight to be used in the crossbar circuit 20 when the environmental temperature of the crossbar circuit 20 changes. The memory device corresponds to a memory unit.

The rewrite control device 31 configures a trained weight update portion (also referred to as a update portion) together with the conductance rewriting device 35. The rewrite control device 31 includes a computer including a processor 32, an internal memory (not illustrated), and the like. When the processor 32 executes a control program stored in the internal memory, the rewrite control device 31 outputs rewriting data, which is used for rewriting and updating a weight of each memristor 24 of the crossbar circuit 20 to a weight suitable for environmental temperature, to the conductance rewriting device 35. The rewriting data includes information identifying the memristor 24 to be rewritten, and information about a conductance value to be set for each memristor 24 identified. Details of a trained-value update process using the rewrite control device 31 will be described below.

The conductance rewriting device 35 is connected to the crossbar circuit 20 so that an arbitrary voltage can be applied between each of the input bars 21 and the corresponding one of the output bars 22 and 23 of the crossbar circuit 20. In the example of FIG. 9, the conductance rewriting device 35 is connected to the input bars 21 and the output bars 22 and 23 by bypassing the CMOS circuits 25 and 26 that embody neurons. The CMOS circuits 25 and 26 are omitted in FIG. 9. The conductance rewriting device 35 applies a voltage having a magnitude equal to or more than a write voltage threshold, used for update to a conductance value instructed, to the identified memristor 24 between the corresponding one of the input bars 21 and the corresponding one of the output bars 22 and 23, according to the rewriting data received from the rewrite control device 31. Accordingly, it is possible to rewrite conductance of the desired memristor 24.

Figure 10:
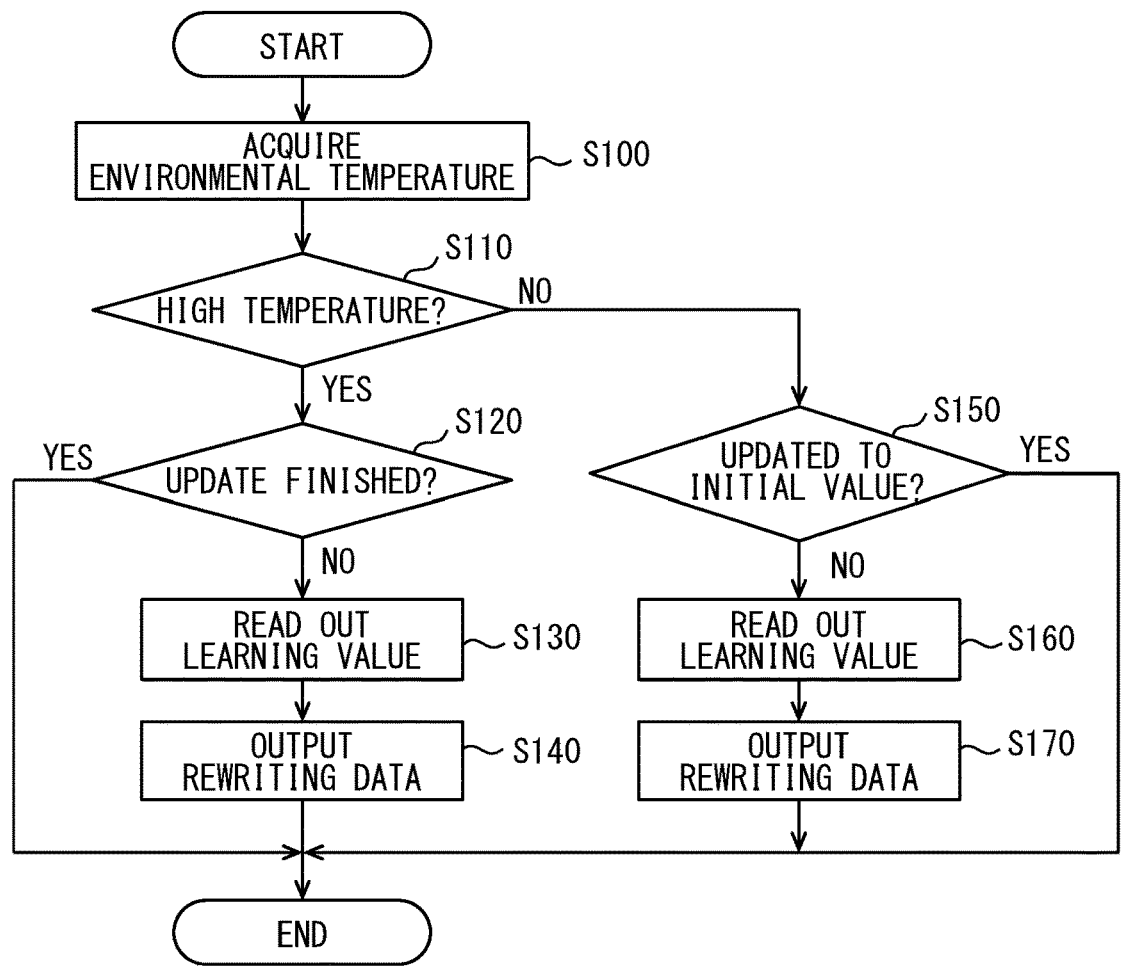
FIG. 10 is a flowchart illustrating a trained-weight update process performed by a rewrite control device.

The trained-value update process performed by the rewrite control device 31 will be described with reference to FIG. 10. FIG. 10 is a flowchart illustrating the trained-value update process performed by the rewrite control device 31. The trained-weight update process illustrated in FIG. 10 is periodically performed by the rewrite control device 31.

At S100, the rewrite control device 31 acquires environmental temperature detected by the temperature sensor 33. Then, at S110, it is determined whether the environmental temperature belongs to a high temperature range equal to or higher than a predetermined temperature. The predetermined temperature for determining whether to be in the high temperature range can be set to any temperature of from 55° C. to 70° C., for example. This is because in the high temperature range equal to or higher than these temperatures, an incidence rate of a recognition error of each chip increases as compared to that at room temperature. At S110, when it is determined that the environmental temperature belongs to the high temperature range, the process proceeds to S120. When it is determined that the environmental temperature does not belong to the high temperature range, the process proceeds to a process of S150.

At S120, it is determined whether a trained weight of the crossbar circuit 20 has been updated to a trained weight suitable for the measured environmental temperature. When it is determined that the trained weight has been updated, the trained-value update process illustrated in the flowchart of FIG. 10 ends. When it is determined that the trained weight has not been updated, the process proceeds to a process of S130. At S130, a trained weight suitable for the measured environmental temperature is read out from the memory device 34. At S140, rewriting data corresponding to the trained weight read out is output to the conductance rewriting device 35.

At S150, which is performed when it is determined that the environmental temperature does not belong to the high temperature range in the determination process of S110, it is determined whether a set of weights of each memristor 24 of the crossbar circuit 20 is returned to an initial value suitable for the room temperature state. When it is determined that the set of weights has been returned to the initial value, the trained-value update process illustrated in the flowchart of FIG. 10 ends. When it is determined that the set of weights has not been returned to the initial value, the process proceeds to step S160. At step S160, the initial value of a trained weight suitable for the room temperature state is read out from the memory device 34. As described above, the memory device 34 also stores the initial value that corresponds to a trained weight adapted to the room temperature state. In S170, the rewriting data corresponding to the read initial value is output to the conductance rewriting device 35.

A trained weight stored in the memory device 34 will be described. The trained weight includes a weight for a signal transmitted between neurons and a weight for a bias signal. The trained weight can be obtained by the following procedure, for example. The trained weight learned in the room temperature state is set for each memristor 24 of the crossbar circuit 20 constituting the artificial NN circuit. An incidence rate of a recognition error of the artificial NN circuit is evaluated at various temperatures belonging to the high temperature range. At this time, a weight (conductance value) of each memristor 24 at a temperature at which the incidence rate of a recognition error deteriorates is read out from the crossbar circuit 20. The weight of each memristor 24, being read out, may be re-trained or re-learned in an artificial NN constructed in a computer, using a general method such as a gradient descent method, or a back propagation method. The re-learning may be performed only once or may be repeated multiple times. The trained weight, which has been re-learned in this manner, is stored in the memory device 34.

The trained weight also may be obtained by another procedure described below. The weight learned in the room temperature state is set for each memristor 24 of the crossbar circuit 20 constituting the artificial NN circuit. An incidence rate of a recognition error of the artificial NN circuit is evaluated at various temperatures belonging to the high temperature range. At this time, a conductance value of each memristor 24 of the crossbar circuit 20 is rewritten so that an incidence rate of a recognition error is improved at a temperature at which the incidence rate of a recognition error has deteriorated. That is, the trained weight of each memristor 24 of the crossbar circuit 20 is re-learned using an actual artificial NN circuit. Then, a conductance value of each memristor 24 of the crossbar circuit 20 when the incidence rate of a recognition error is improved is read out and stored in the memory device 34 as a trained weight.

When a trained weight is obtained according to the procedure described above, the memory device 34 stores multiple trained weights suitable for various temperatures in the high temperature range. When the number of trained weights increases, memory capacity of the memory device 34 may increase and trained weights may be frequently updated in accordance with change in environmental temperature. In order to prevent this difficulty, the high temperature range may be divided into multiple temperature ranges, and the memory device 34 may store trained weights used in each of the multiple temperature ranges. For example, the memory device 34 stores a trained weight suitable for 70° C., a trained weight suitable for 85° C., and a trained weight suitable for 100° C. The trained weights suitable for each temperature range may be obtained through the re-learning. For example, the rewrite control device 31 may use the trained weight suitable for 70° C. in a temperature range of 60° C. or more and less than 75° C. Similarly, the rewrite control device 31 may use the trained weight suitable for 85° C. in a temperature range of 75° C. or more and less than 90° C. The rewrite control device 31 may use the trained weight suitable for 100° C. in a temperature range of 90° C. or more. As a result, it may be possible to suppress this situation described above.

Second Embodiment

The first embodiments described above is configured to re-learn a weight for a signal transmitted between neurons and a weight for a bias signal at environmental temperature in the high temperature range, and to store the trained weight re-learned in the memory device 34 as trained weights suitable for respective environmental temperatures in the high temperature range. As described above, when a trained weight obtained by re-learning a weight for a signal to be transmitted between neurons and a weight for a bias signal re-learn is used, it may be possible to sufficiently reduce an incidence rate of a recognition error at respective environmental temperatures in the high temperature range.

As the number of learning weights stored in the memory device 34 increases, the number of memristors 24 each with a conductance value to be rewritten also increases. This may cause a situation in that it takes a long time to update the weight, or the conductance rewriting device 35 requires a large scale. To address this kind of situation, it may be considered to update a part of weights in the crossbar circuit 20, instead of all of the weights. Examples of a part of weights to be updated include a weight for a bias signal, or a weight for a part of the input signals.

Figure 11:
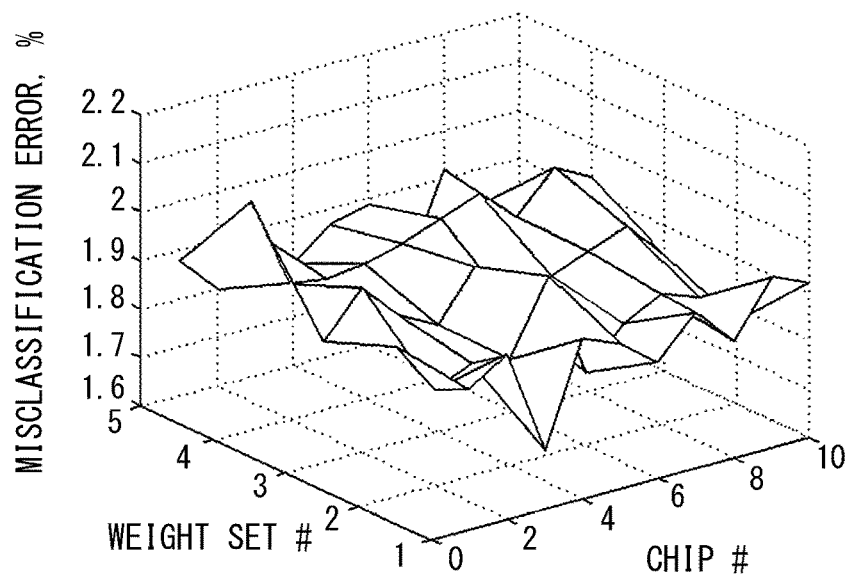
FIG. 11 is a graph showing results acquired by examining incidence rates of a recognition error when environmental temperature changed to a temperature belonging to a high temperature range in a crossbar circuit of the artificial NN circuit according to a second embodiment, mounted on each chip, having the incidence rates of a recognition error shown in FIG. 7 at room temperature state, and only a weight for a bias signal was updated to a trained weight re-learned to be suitable for the temperature.

For example, results shown in FIG. 11 were acquired by examining incidence rates of a recognition error when environmental temperature changed to a temperature (e.g., 100° C.) belonging to the high temperature range in the crossbar circuit 20 of the artificial NN circuit mounted on each chip, having the incidence rates of a recognition error shown in FIG. 7 at room temperature, and only a weight for a bias signal was updated to a trained weight re-learned to be suitable for the temperature. From the results shown in FIG. 11, the incidence rate of a recognition error is reduced by only rewriting the weight for a bias signal with the trained weight re-learned, as compared to when no weight was changed as shown in FIG. 8.

Figure 12:
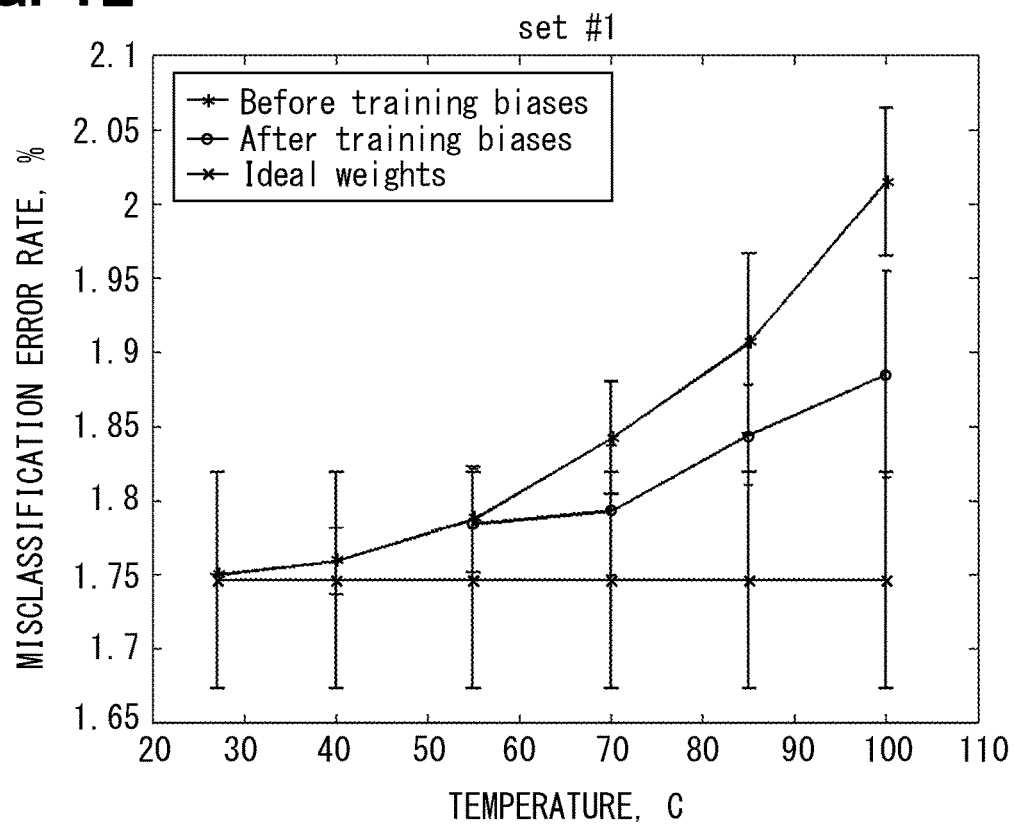
FIG. 12 is a graph showing results acquired by examining incidence rates of a recognition error at respective temperatures from room temperature to 100° C., using ten chips in each of which a set of weights #1 described in FIG. 7 was set for each memristor of the crossbar circuit, when only a weight for a bias signal was updated and when no weight was changed, corresponding to the artificial NN circuit according to the second embodiment.

Another graph is used to describe in more detail how much difference occurred in an incidence rate of a recognition error between when only the weight for a bias signal was updated and when no weight was changed, for change in environmental temperature. FIG. 12 shows results acquired by examining incidence rates of a recognition error at respective temperatures from room temperature to 100° C., using ten chips in each of which the set of weights #1 described in FIG. 7 was set for each memristor 24 of the crossbar circuit 20, when only a weight for a bias signal was updated and when no weight was changed. The graph of FIG. 12 shows a line segment connecting variations of an incidence rate of a recognition error and its average value in the case of an ideal weight in which a weight of each of the memristors 24 does not change in accordance with temperature change; a line segment connecting variations of an incidence rate of a recognition error and its average value in the case where only a weight for a bias signal was updated using a trained weight re-learned to be suitable for each of temperatures of 70° C., 85° C., and 100° C.; and a line segment connecting variations of an incidence rate of a recognition error and its average value in the case where no weight was changed.

When no weight is changed, a variation in magnitude of change in the conductance value of each memristor 24 directly affects an incidence rate of a recognition error. As a result, as environmental temperature rises from room temperature (about 27° C.), the incidence rate of a recognition error also increases, and an average value of ten chips exceeds 2% at 100° C.

When only a weight for a bias signal is updated using a trained weight re-learned to be suitable for each temperature as in the present embodiment, an average incidence rate of a recognition error of ten chips may be reduced and improved as compared to when no weight is changed in an environmental temperature of from 70° C. to 100° C.

Figure 13:
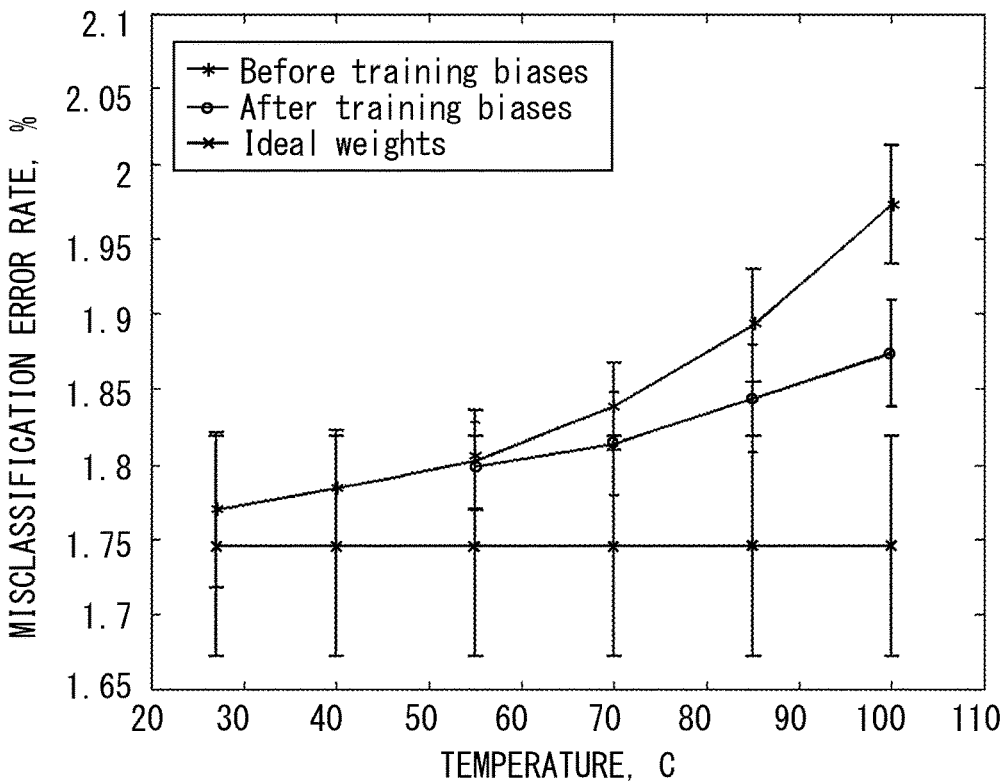
FIG. 13 is a graph showing incidence rates of a recognition error at respective temperatures from room temperature to 100° C., using ten chips prepared for each of sets of weights #1 to #5 described in FIG. 7, being set for each memristor of the crossbar circuit, when only a weight for a bias signal was updated and when no weight was changed, corresponding to the artificial NN circuit according to the second embodiment.

FIG. 13 shows results acquired by examining incidence rates of a recognition error at respective temperatures from room temperature to 100° C., using ten chips in each of which the corresponding one of the sets of weights #1 to #5 described in FIG. 7 was set for each memristor 24 of the crossbar circuit 20 (thus, total fifty chips), when only a weight for a bias signal was updated and when no weight was changed. More specifically, FIG. 13 shows variations of an average incidence rate of a recognition error for each ten chips in each of which the corresponding one of the sets of weights #1 to #5 was set, and a line segment connecting an average value of the variations, for the case of an ideal weight in which a weight does not change in accordance with temperature change, the case where only a weight for a bias signal was updated using a trained weight re-learned to be suitable for each temperature, and the case where no weight was changed.

The graph of FIG. 13 illustrates that when only a weight for a bias signal was updated using a trained weight re-learned to be suitable for each temperature, the incidence rates of a recognition error were reduced as compared to when no weight was changed.

Third Embodiment

In the first and second embodiments, the high temperature range is divided into multiple temperature ranges, and a trained weight suitable for each of the temperature ranges is stored in the memory device 34, and then the set of weights for each memristor 24 of the crossbar circuit 20 is updated according to which temperature range the detected environmental temperature belongs to. It may be preferable that the frequency of update of a trained weight is as low as possible.

Figure 14:
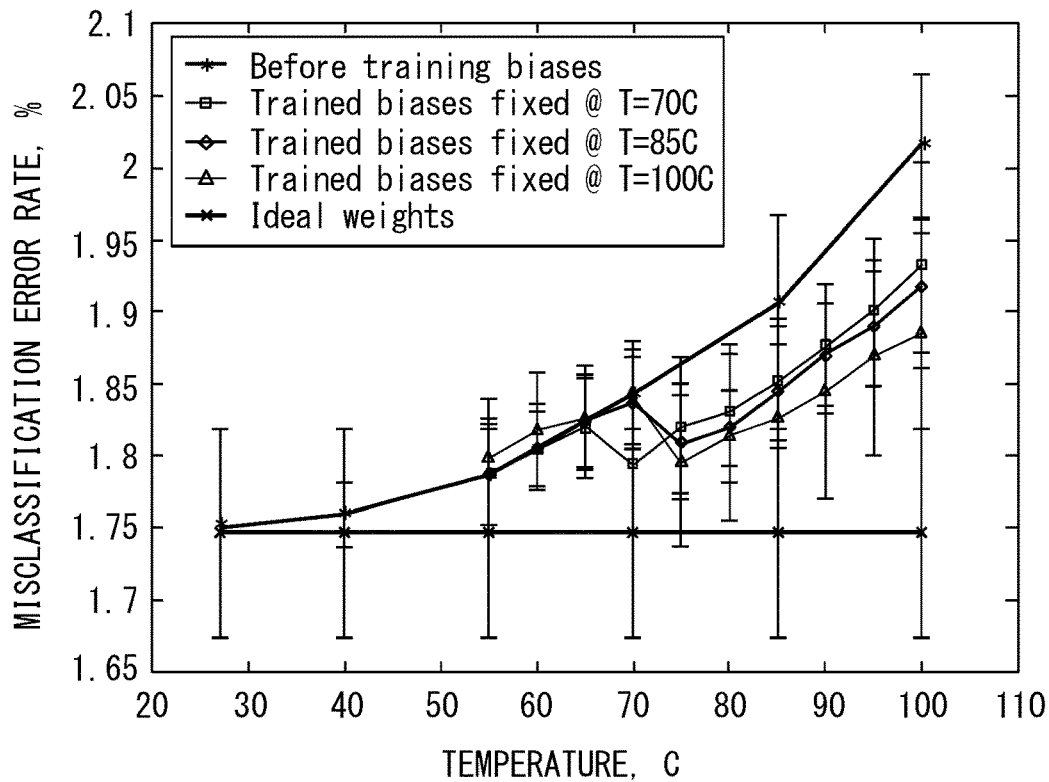
FIG. 14 is a graph showing incidence rates of a recognition error in the high temperature range, using ten chips in each of which the set of weights #1 described in FIG. 7 was set for each memristor of the crossbar circuit, when only a weight for a bias signal was updated using each of trained weights suitable for respective temperatures of 70° C., 85° C., and 100° C., and when no weight was changed, corresponding to the artificial NN circuit according to a third embodiment.
Figure 15:
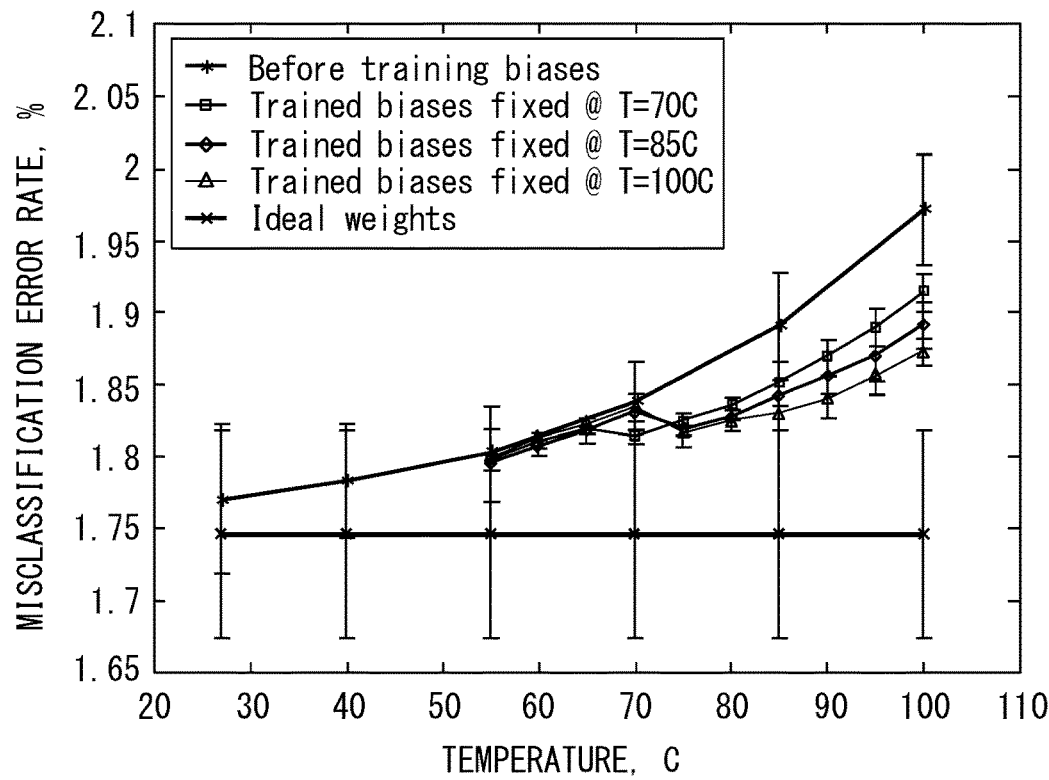
FIG. 15 is a graph showing variations of an average incidence rate of a recognition error in the high temperature range for each ten chips in each of which the corresponding one of the sets of weights #1 to #5 was set, and a line segment connecting an average value of the variations, when only a weight for a bias signal was updated using each of trained weights suitable for respective temperatures of 70° C., 85° C., and 100° C., and when no weight was changed, corresponding to the artificial NN circuit according to the third embodiment.

For this reason, each artificial NN circuit in which only a weight for a bias signal was updated using a trained weight re-learned to be suitable for each of temperatures of 70° C., 85° C., and 100° C., was examined for an incidence rate of a recognition error throughout the high temperature range. Results of the examination are shown in FIG. 14 and FIG. 15. As with FIG. 12, FIG. 14 is a graph showing incidence rates of a recognition error in the high temperature range, using ten chips in each of which the set of weights #1 described in FIG. 7 was set for each memristor 24 of the crossbar circuit 20, when only a weight for a bias signal was updated using each of trained weights suitable for respective temperatures of 70° C., 85° C., and 100° C., and when no weight was changed. As with FIG. 13, FIG. 15 shows variations of an average incidence rate of a recognition error in the high temperature range for each ten chips in each of which the corresponding one of the sets of weights #1 to #5 was set, and a line segment connecting an average value of the variations, when only a weight for a bias signal was updated using each of trained weights suitable for respective temperatures of 70° C., 85° C., and 100° C., and when no weight was changed.

From the graphs of FIG. 14 and FIG. 15, an incidence rate of a recognition error can be reduced in any artificial NN circuit in which only a weight for a bias signal was updated using each of trained weights suitable for respective temperatures of 70° C., 85° C., and 100° C., substantially throughout the high temperature range, as compared to the artificial NN circuit in which no weight was changed. Therefore, when a weight of each memristor 24 in the crossbar circuit 20 is updated using a trained weight re-learned to be suitable for any temperature belonging to the high temperature range, it is possible to use an artificial NN circuit whose trained weight is updated throughout the high temperature range, and to sufficiently reduce an incidence rate of a recognition error as compared to when no weight is changed.

In addition, the graphs of FIG. 14 and FIG. 15 show that in many ranges in the high temperature range, the artificial NN circuit with a weight updated using the trained weight suitable for 85° C. has an incidence rate of a recognition error lower than that of the artificial NN circuit with a weight updated using the trained weight suitable for 70° C. Further, the artificial NN circuit with a weight updated using the trained weight suitable for 100° C. has an incidence rate of a recognition error lower than that of the artificial NN circuit with the weight updated using the trained weight suitable for 85° C. From these results, the trained weight to be used throughout the high temperature range may be learned under a relatively high temperature environment in the high temperature range.

When one trained weight is used throughout the high temperature range, the substantially same weight as the weight learned in the room temperature state, included in the trained weight, may be eliminated from the trained weights stored in the memory device 34 because a conductance value of the memristor 24 corresponding to the weight is not required to be updated.

Fourth Embodiment

In the second embodiment, not all trained weights in the crossbar circuit 20 are updated in accordance with changes in the environmental temperature, but only some weights such as weights for the bias signal is updated.

In the second embodiment, the bias signal is normally input to one of the input bars 21 of the crossbar circuit 20, as shown in FIG. 4. The bias signal is given a weight by the memristor 24 provided at the intersection of the input bar 21 to which the bias signal is input and the output bars 22, 23 intersecting the input bar 21, and flows into the output bars 22, 23. Thereafter, the weighted bias signal is integrated with other weighted input signals flowing into the respective output bars 22, 23. The different between the integrated signal of the output bar 22 and the integrated signal of the output bar 23 is obtained by the differential operational amplifier 28 to be output. This calculation may be expressed in the following expression 2.

Output of differential operational amplifier=$\Sigma(w_{ij}-w_{ij+1})*x_i+(w_{bj}-w_{bj+1})*x_b$ (Expression 2)

In Expression 2, the term $x_i$ represents the input voltage signal corresponding to the pixel value of the image or the input voltage signal corresponding to the output from the output neuron of the previous layer, which is input to the crossbar circuit 20. The term $(w_{ij}-w_{ij+1})$ indicates a difference in weight with respect to the input voltage signal $x_i$. The term $x_b$ represents a bias signal input to the crossbar circuit 20. The term $(w_{bj}-w_{bj+1})$ indicates a weight difference with respect to the bias signal $x_b$.

As shown in Expression 2, the weighted bias signal $(w_{bj}-w_{bj+1})*x_b$ is only added to the result of taking the difference between the integrated signals of the output bars 22, 23. Therefore, even if the bias signal is added to the output of the differential operational amplifier 28 before being input to the activation function processing circuit without inputting into the crossbar circuit 20, a result similar to Expression 2 is obtained.

Figure 16:
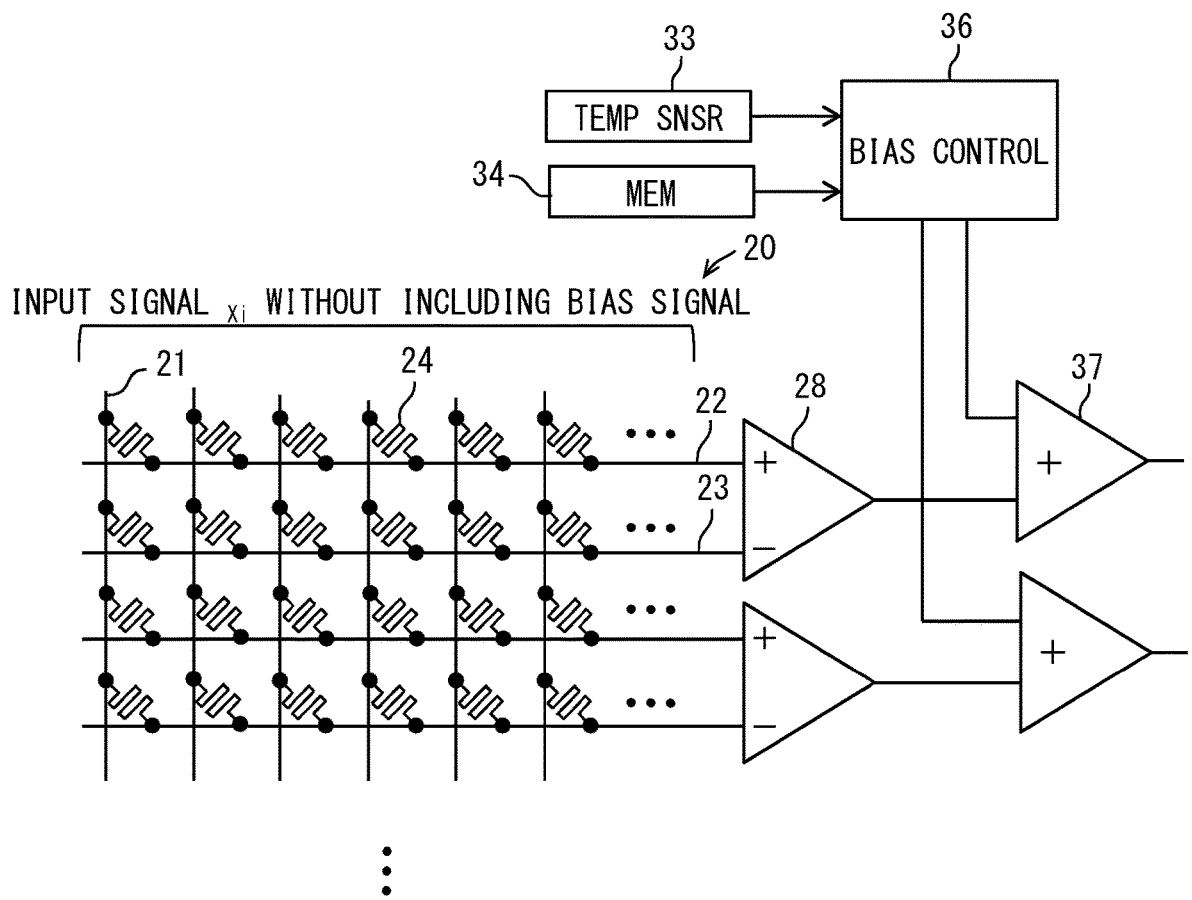
FIG. 16 is a diagram illustrating an example of a configuration of a crossbar circuit of an artificial NN circuit according to a fourth embodiment and a processing circuit that processes an output signal of the crossbar circuit.

According to an artificial NN circuit of the fourth embodiment, as shown in FIG. 16, only the input voltage signal $x_i$ without including the bias signal is input to the crossbar circuit 20. The weighted bias signal $(w_{bj}-w_{bj+1})*x_b$ is added to the output of the differential operational amplifier 28. The weighted bias signal $(w_{bj}-w_{bj+1})*x_b$ corresponds to a trained weight. The artificial NN circuit of the present embodiment includes the memory device 34 storing weighed bias suitable for each environmental temperature of the crossbar circuit 20, a bias control device 36 that reads out and outputs from the memory device 34, the weighted bias signal suitable for the environmental temperature detected by the temperature sensor 33, and an adder 37 that adds the weighted bias signal output from the bias control device 36 and the output from the differential operational amplifier 28. In addition to the weighted bias signal as an initial value used at room temperature, the memory device 34 may divide the high temperature region into multiple temperature ranges as described in the second embodiment, and may store the weighted bias signals as a trained weight suitable for the respective temperature range. Alternatively, in addition to the weighted bias signal as an initial value used at room temperature, the memory device 34 may store a weighted bias signal as one trained weight used throughout the high temperature region, as described in the third embodiment.

In the artificial NN circuit according to the fourth embodiment, the weighted bias signal used in the processing circuit that processes the output signal of the crossbar circuit 20 is updated to a value corresponding to a change in environmental temperature, as a trained weight. In such a configuration, the weighted bias signal as the trained weight only needs to be read from the memory device 34 as a value suitable for the environmental temperature of the crossbar circuit 20 and output to the adder 37. In other words, it is not necessary to rewrite the conductance value of the memristor 24 in the crossbar circuit 20. It may be possible to update the trained weight easily and quickly.

Fifth Embodiment

According to the artificial NN circuit according to the first to fourth embodiments, the memory device 34 stores a trained weight used in the crossbar circuit 20 and/or the processing circuit when the environmental temperature of the crossbar circuit 20 changes. A trained weight is read from the memory device 34 in response to a change in the environmental temperature. The set of weights of the crossbar circuit 20 may be updated, or the weighted bias signal used in the processing circuit may be updated. On the other hand, the artificial NN circuit according to the fifth embodiment includes multiple crossbar circuits 20 that have been set in advance so that the conductance value of the memristor 24 is adapted to different environmental temperatures. By selecting a corresponding crossbar circuit 20 to be used in accordance with the detected environmental temperature of the crossbar circuit 20, a trained weight is updated so as to correspond to the change in the environmental temperature.

Figure 17:
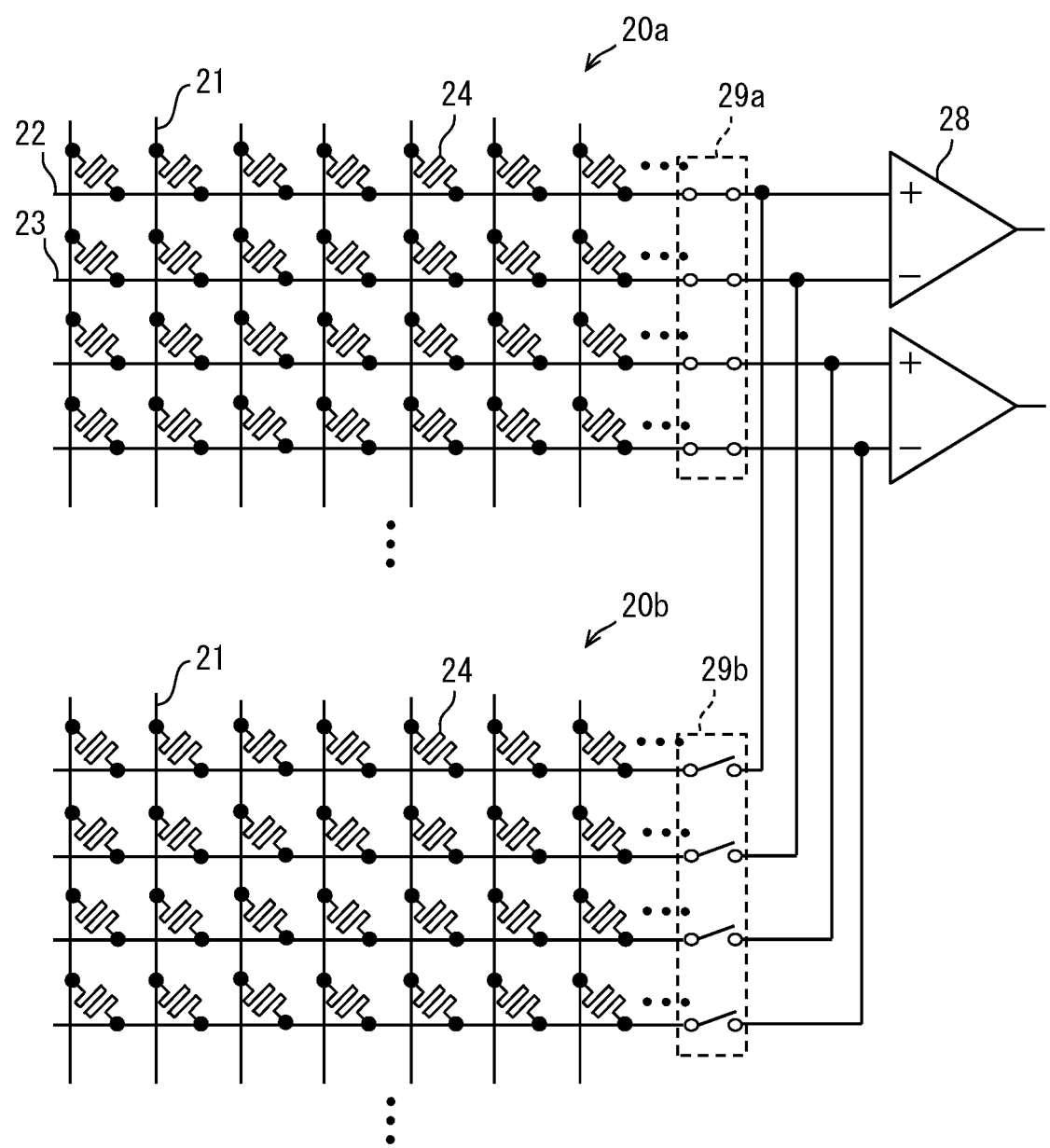
FIG. 17 is a diagram illustrating an example of a configuration of a crossbar circuit of an artificial NN circuit according to a fifth embodiment.

FIG. 17 is a diagram illustrating an example of the configuration of the artificial NN circuit according to the fifth embodiment. As shown in FIG. 17, the artificial NN circuit according to the present embodiment includes multiple crossbar circuits 20a, 20b having weights adapted to different environmental temperatures by the conductance values of the respective memristors 24. The crossbar circuit 20a is connected to the differential operational amplifier 28 via a changeover switch 29a. The crossbar circuit 20b is connected to the differential operational amplifier 28 via a changeover switch 29b. A control device (not shown) turns on a changeover switch (corresponding to one of the changeover switches 29a, 29b) of the crossbar circuit (that is, one of the crossbar circuits 20a, 20b) having a weight adapted to the environmental temperature according to the environmental temperature detected by the temperature sensor. Then, the changeover switches 29a, 29b are controlled so that the changeover switch (that is, the other of the changeover switches 29a, 29b) of the other crossbar circuit (that is, the other of the crossbar circuits 20a, 20b) is turned off. Even with such a configuration, the set of weights as a trained weight used in the crossbar circuits 20a, 20b can be updated to a value corresponding to a change in the environmental temperature without rewriting the conductance value of the memristor 24 of the crossbar circuit 20.

FIG. 17 shows an example in which the artificial NN circuit includes two crossbar circuits 20a, 20b. Three or more crossbar circuits 20a, 20b may be provided and the crossbar circuit may be switched more finely in accordance with the temperature change.

Sixth Embodiment

Figure 18:
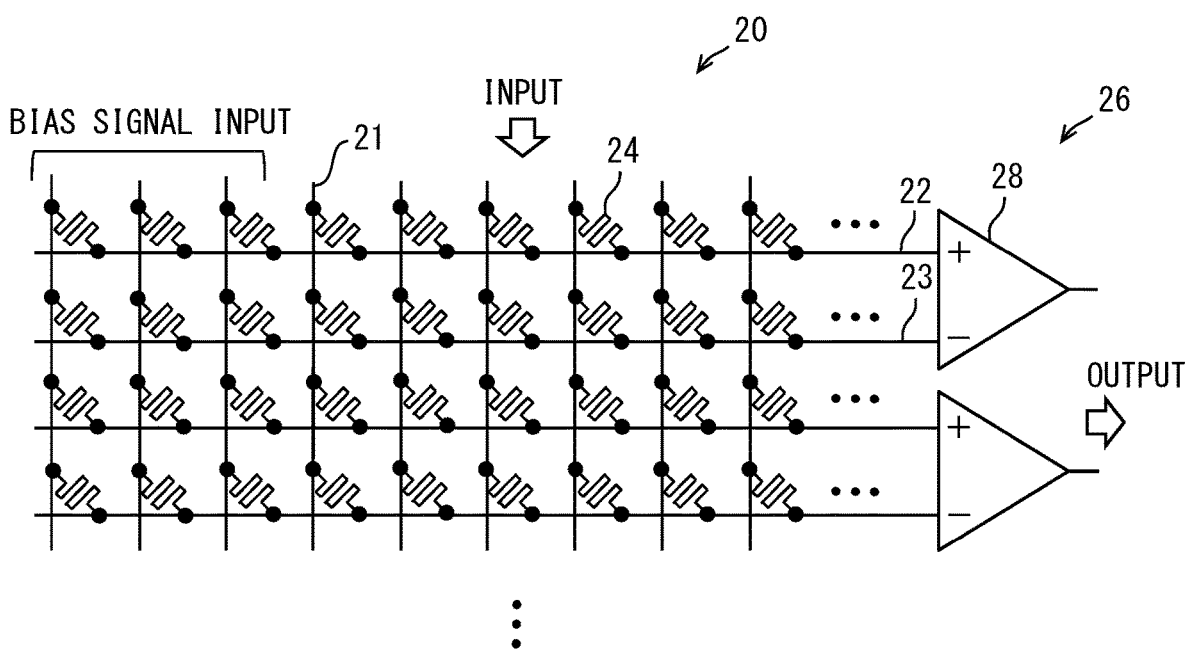
FIG. 18 is a diagram illustrating an example of a configuration of a crossbar circuit of an artificial NN circuit according to a sixth embodiment.

In the fifth embodiment, multiple crossbar circuits 20a, 20b having weights adapted to different environmental temperatures are provided, and the multiple crossbar circuits 20a, 20b are switched and used in accordance with the detected environmental temperatures. On the other hand, in the artificial NN circuit of the sixth embodiment, as shown in FIG. 18, in the crossbar circuit 20, multiple input bars 21 are provided as input bars for inputting a bias signal. In the multiple input bars 21, conductance values of the memristors 24 connected to the respective input bars 21 are set in advance, so that weights adapted to different environmental temperatures can be given to a bias signal.

In the artificial NN circuit of the present embodiment, a control device (not shown) selects an input bar which is set with a weight adapted to the environmental temperature, in accordance with the environmental temperature detected by the temperature sensor, and the bias signal is input to only the selected input bar. Only the selected input bar receives the bias signal. In other words, no signal is input to any input bar other than the selected input bar among the multiple input bars 21 for inputting the bias signal. Thereby, the artificial NN circuit of the present embodiment can switch the weight given to a bias signal in accordance with the environmental temperature, without using a changeover switch like the fifth embodiment. Further, similar to the artificial NN circuits of the fourth and fifth embodiments, the artificial NN circuit of the present embodiment can also update the trained weight used in the crossbar circuit to a trained weight corresponding to a change in the environmental temperature, without rewriting the conductance value of the memristor 24 of the crossbar circuit 20.

In each of the present embodiments, the output bars of the crossbar circuit 20 are used as differential paired output bars to enable a positive or negative weight to be given to a signal to be transmitted. The differential paired output bars may not be necessarily set in the crossbar circuit 20. While every weight of the memristors 24 connected to the output bars has a positive sign, magnitude of the positive weight may express a level of an influence degree.

In the second embodiment, a weight for a bias signal is updated as a trained weight. The trained weight may be the bias signal itself in addition to or instead of the weight for the bias signal. When the trained weight is only magnitude of the bias signal, a conductance value of the memristor 24 is not required to be changed as in the fourth to sixth embodiments. Thus, the trained weight of the crossbar circuit 20 can be easily and quickly updated. As described above, the trained weight used in the crossbar circuit 20 includes at least one of the weight given to the signal to be transmitted between neurons, the weight given to the bias signal, and the magnitude of the bias signal.

In addition, instead of updating trained weights in all crossbar circuits 20 included in the artificial NN circuit in accordance with environmental temperature detected, the trained weights may be updated only in some of the crossbar circuits 20, such as a crossbar circuit between the input layer and the intermediate layer, and/or a crossbar circuit between the intermediate layer and the output layer.

For example, in the first embodiment, the weight learned in the room temperature state is set by each memristor 24 of the crossbar circuit 20. When the environmental temperature of the crossbar circuit 20 changes to a temperature belonging to a high temperature region that is equal to or higher than a predetermined temperature, a trained weight in the crossbar circuit 20 is updated so as to adapt to the changed temperature.

In the first to sixth embodiments, the trained weight initially used in the crossbar circuit and/or the processing circuit may be learned at a temperature other than the room temperature state (that is, a temperature higher than the room temperature or a temperature lower than the room temperature). By learning a trained weight adapted to a temperature range (including temperature range lower than the temperature at which the trained weight used initially is learned and higher than the temperature at which the trained weight used initially is learned) in which the performance of the artificial NN circuit may deteriorate due to the temperature characteristics of the memristor 24, other than the temperature at which the trained weight used initially, the trained weight may be updated in accordance with a change in the environmental temperature of the crossbar circuit 20.

Incidentally, a trained weight may be at least one trained weight and may be multiple weights. In addition, a trained weight in the present application may be referred to as a learned value, a learning value, a set of trained weights, a set of learned values. The trained weight may correspond to a set of weights in a crossbar circuit, a conductance of a memristor, a weight for a signal transmitted between neurons, a weight for a bias signal, a weighed bias signal.

Each embodiment described above may be implemented in any combination even if the combination is not described as long as there is no trouble in carrying out in combination.

It is noted that a flowchart or the processing of the flowchart in the present application includes multiple steps (also referred to as sections), each of which is represented, for instance, as S100. Further, each step can be divided into several sub-steps while several steps can be combined into a single step.

While various embodiments, configurations, and aspects of an artificial neural network circuit and a method for switching trained weight in artificial neural network circuit according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An artificial neural network circuit comprising:
at least one crossbar circuit that is configured to transmit a signal between layered neurons of an artificial neural network, wherein the crossbar circuit includes
a plurality of input bars,
a plurality of output bars arranged intersecting the input bars, and
a plurality of memristors that are disposed at respective intersections of the input bars and the output bars to give a weight to the signal to be transmitted, as a variable resistance memory;
a processing circuit that is configured to calculate a sum of signals flowing into each of the output bars while a weight to a corresponding signal is given by each of the memristors;
a temperature sensor that is configured to detect environmental temperature of the crossbar circuit; and
an update portion that is configured to update at least one of a plurality of trained weights,
wherein the plurality of trained weights, which are applied by the plurality of memristors, are used in the at least one crossbar circuit and/or the processing circuit, wherein:
the input bars receive the signal to be transmitted between the neurons;
the input bars further receive a bias signal; and
the plurality of trained weights include
a plurality of trained weights given to the signal to be transmitted between the neurons,
a trained weight given to the bias signal, and
a magnitude of the bias signal,
wherein the update portion updates, as the at least one of the plurality of trained weights, the trained weight given to the bias signal corresponding to a single temperature value of the environmental temperature detected by the temperature sensor without updating remaining trained weights given to signal inputs of a remainder of the input bars.

2. The artificial neural network circuit according to claim 1, wherein:
the bias signal weighted by the updated weight corresponds to a weighted bias signal; and
the processing circuit is configured to add the weighted bias signal to a signal after calculating a sum of the signals flowing into each of the output bars.

3. The artificial neural network circuit according to claim 1, wherein:
the trained weight of the memristor given to the bias signal is rewritten by the update portion according to a change in the environmental temperature, causing the at least one of the plurality of trained weights to be updated according to the change in the environmental temperature.

4. The artificial neural network circuit according to claim 1, wherein:
a plurality of crossbar circuits are provided so as to give weights adapted to different environmental temperatures;
the at least one of the plurality of trained weights respectively correspond to the weights adapted to different environmental temperatures; and
the update portion selects from the crossbar circuits, a crossbar circuit having a weight adapted to the detected environmental temperature, causing the at least one of the plurality of trained weights to be updated to another trained weight according to the change in the environmental temperature.

5. The artificial neural network circuit according to claim 1, wherein:
a plurality of crossbar circuits are provided so that the input bars inputting bias signals give weights adapted to different environmental temperatures;
the at least one of the plurality of trained weights respectively correspond to the weights adapted to different environmental temperatures; and
the update portion selects from the input bars, an input bar having a weight adapted to the detected environmental temperature and gives a bias signal only to the selected input bar, causing the at least one of the plurality of trained weights to be updated to another trained weight according to the change in the environmental temperature.

6. The artificial neural network circuit according to claim 1, wherein:
a temperature region other than a temperature at which the trained weight initially given to the bias signal in the crossbar circuit and/or the processing circuit has been learned is divided into a plurality of temperature ranges; and
the at least one of the plurality of trained weights includes a plurality of trained weights respectively used in the temperature ranges.

7. The artificial neural network circuit according to claim 1, wherein:
the at least one of the plurality of trained weights includes one trained weight used in a temperature region other than the temperature at which the trained weight initially given to the bias signal in the crossbar circuit and/or the processing circuit has been learned.

8. The artificial neural network circuit according to claim 7, wherein:
the one trained weight has been learned in a relatively high temperature environment within the temperature region.

9. A method for switching a trained weight in an artificial neural network circuit, the artificial neural network circuit including:
at least one crossbar circuit configured to transmit a signal between layered neurons, the crossbar circuit including
a plurality of input bars,
a plurality of output bars arranged intersecting the input bars, and
a plurality of memristors disposed at respective intersections of the input bars and the output bars to give a weight to the signal to be transmitted, as a variable resistance memory; and
a processing circuit configured to calculate a sum of signals flowing into each of the output bars while a weight to a corresponding signal is given by each of the memristors, the method comprising:

detecting environmental temperature of the crossbar circuit by a temperature sensor; and
updating at least one of a plurality of trained weights, wherein the plurality of trained weights, which are applied by the plurality of memristors, are used in the at least one crossbar circuit and/or the processing circuit, wherein:
the input bars receive the signal to be transmitted between the neurons;
the input bars further receive a bias signal; and
the plurality of trained weights include
a plurality of trained weights given to the signal to be transmitted between the neurons,
a trained weight given to the bias signal, and
a magnitude of the bias signal,
wherein the update portion updates, as the at least one of the plurality of trained weights, the trained weight given to the bias signal corresponding to a single temperature value of the environmental temperature detected by the temperature sensor without updating remaining trained weights given to signal inputs of a remainder of the input bars.

10. The method for switching the trained weight in the artificial neural network circuit according to claim 9, wherein:
the bias signal weighted by the updated weight corresponds to a weighted bias signal; and
the processing circuit adds the weighted bias signal to the signal after calculating a sum of the signals flowing into each of the output bars.

11. The method for switching the trained weight in the artificial neural network circuit according to claim 9, wherein:
the trained weight of the memristor given to the bias signal is rewritten according to a change in the environmental temperature, causing the at least one of the plurality of trained weights to be updated to another trained weight according to the change in the environmental temperature.

12. The method for switching the trained weight in the artificial neural network circuit according to claim 9, wherein:
a plurality of crossbar circuits are provided so as to give weights adapted to different environmental temperatures to an identical input signal;
the at least one of the plurality of trained weights respectively correspond to the weights adapted to different environmental temperatures; and
updating from one set of trained weights to another set of trained weights comprises selecting from the plurality of crossbar circuits, a crossbar circuit having a weight adapted to the detected environmental temperature, causing at least one of the plurality of trained weights to be updated to another trained weight according to the change in the environmental temperature.

13. The method for switching the trained weight in the artificial neural network circuit according to claim 9, wherein:
a plurality of crossbar circuits are provided so that the input bars inputting a bias signal give weights adapted to different environmental temperatures;
the at least one of the plurality of trained weights respectively correspond to weights adapted to different environmental temperatures;
updating from one set of trained weights to another set of trained weights comprises selecting from the input bars, an input bar having a weight adapted to the detected environmental temperature and gives the bias signal only to the selected input bar, causing the at least one of the plurality of trained weights to be updated to another trained weight according to the change in the environmental temperature.

14. The method for switching the trained weight in the artificial neural network circuit according to claim 9, wherein:
a temperature region other than a temperature at which the trained weight initially given to the bias signal in the crossbar circuit and/or the processing circuit has been learned is divided into a plurality of temperature ranges; and
the at least one of the plurality of trained weights includes a plurality of trained weights respectively used in the plurality of temperature ranges.

15. The method for switching the trained weight in the artificial neural network circuit according to claim 9, wherein:
the at least one of the plurality of trained weights includes one trained weight used in a temperature region other than the temperature at which the trained weight initially given to the bias signal in the crossbar circuit and/or the processing circuit has been learned.

16. The method for switching the trained weight in the artificial neural network circuit according to claim 15, wherein:
the one trained weight has been learned in a relatively high temperature environment within the temperature region.

* * * * *